Oct. 15, 1929.  C. A. DUNHAM  1,731,612
TEMPERATURE INDICATOR FOR ENGINES
Filed Dec. 4, 1922  2 Sheets-Sheet 1
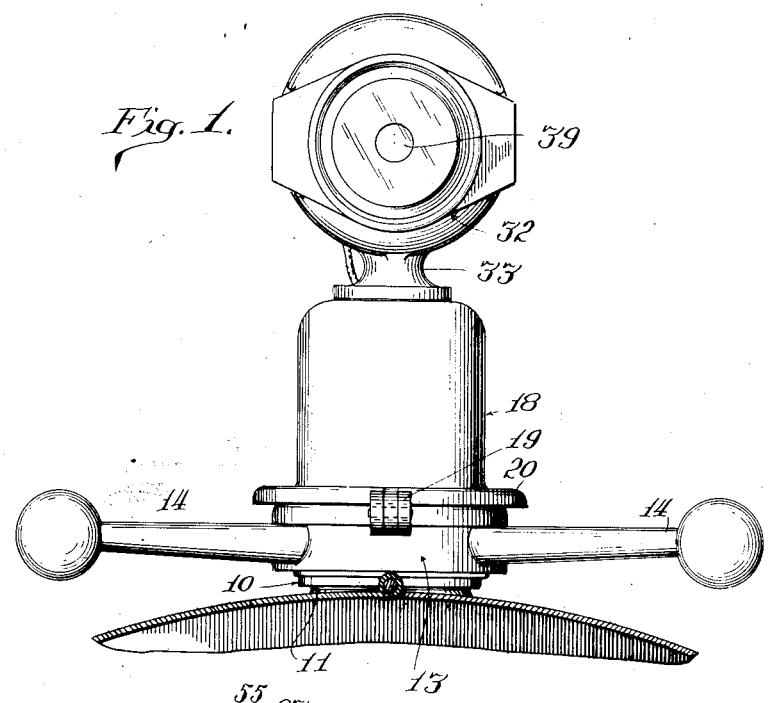
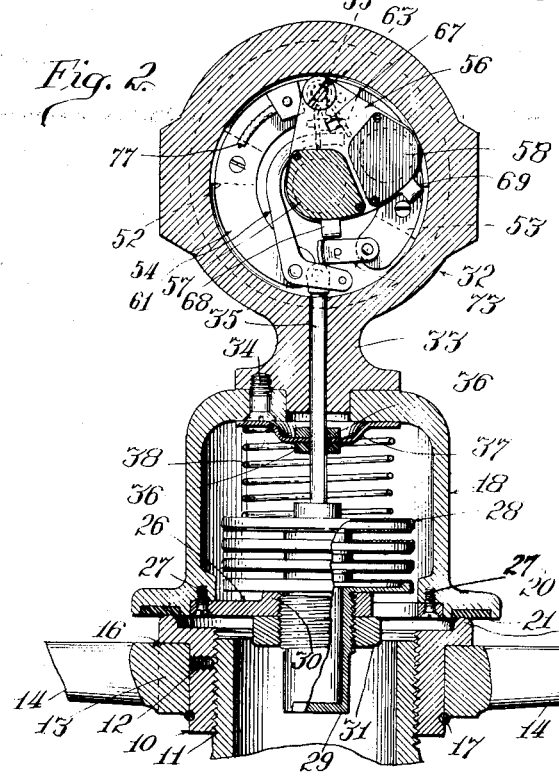
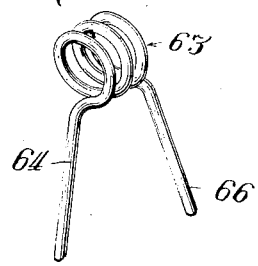

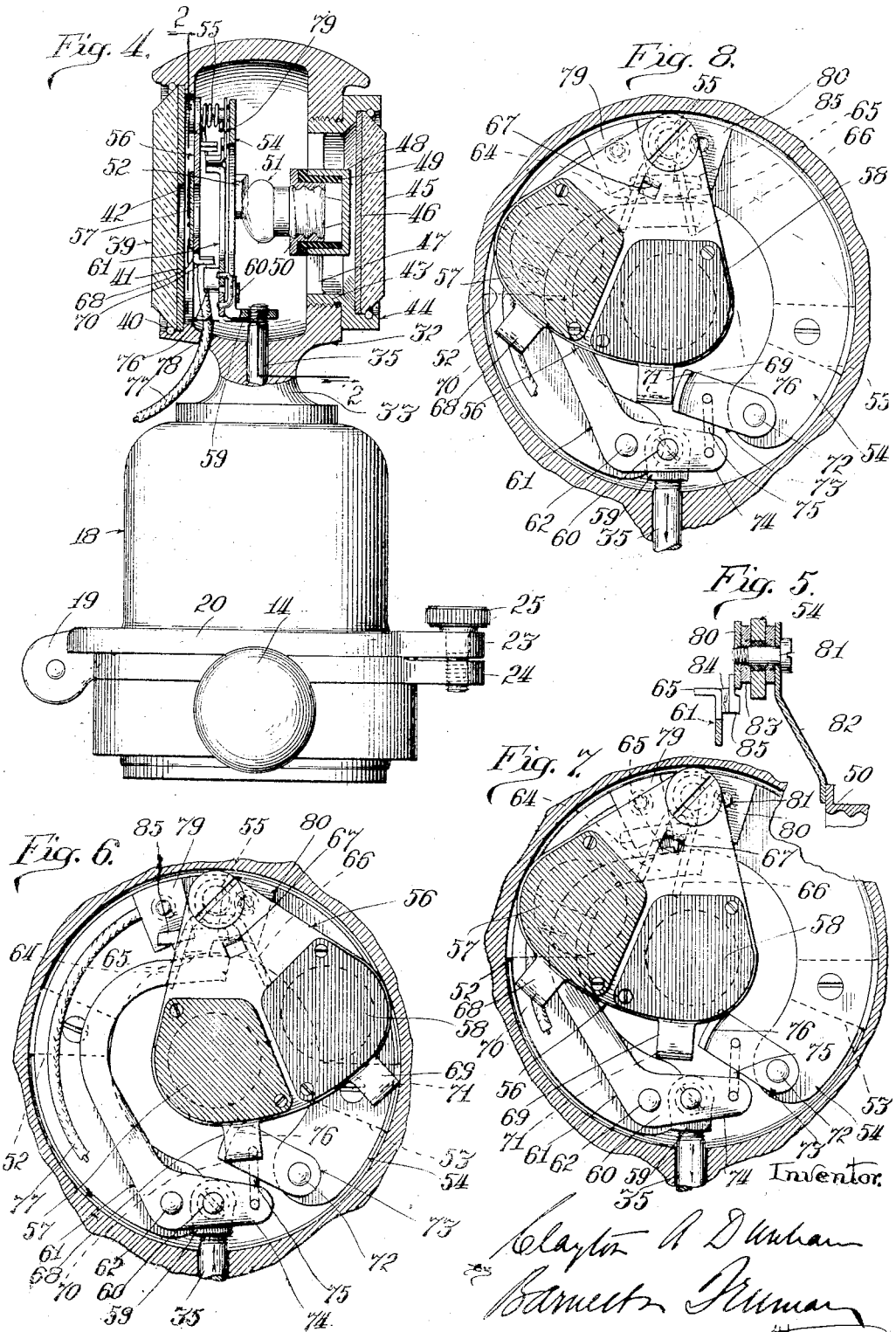

Patented Oct. 15, 1929

1,731,612

UNITED STATES PATENT OFFICE

CLAYTON L. DUNHAM, OF GLENCOE, ILLINOIS, ASSIGNOR TO C. A. DUNHAM COMPANY, OF MARSHALLTOWN, IOWA, A CORPORATION OF IOWA

TEMPERATURE INDICATOR FOR ENGINES

Application filed December 4, 1922. Serial No. 604,813.

My invention relates to devices for indicating the working temperatures of engines, the invention being concerned more particularly with indicators of the type used on the radiators of water cooled automobile engines, for the purpose of giving the driver of the automobile warning when the engine is operated at an abnormal temperature.

The general purpose of the invention is to provide an indicator of this type which will give the desired indication or indications more certainly, accurately and effectively than the devices heretofore used in this connection.

One of the specific objects of the invention is to provide an indicating device which will give a plainly visible and readily recognizable signal whenever the engine is operating at a temperature within the range of temperatures that may be considered normal, and an indication of specifically different character when the engine is overheated so as to be operated at a temperature above the normal range, the indicating signal being, therefore, changed positively from safe to danger, and vice versa, when the engine heats or cools to certain critical temperatures.

A further object is to so construct the device that it will also give an indication when the motor is operating at a temperature below the normal range. This feature, however, is optional though preferred.

A further object is to provide an indicator of this type with novel means whereby illuminated signals of different colors are displayed so as to give the desired indications or two of them; the preferred arrangement for a three-signal indicator being to provide for illuminated signals of different colors for the normal and supernormal ranges of temperatures and an unilluminated signal to indicate subnormal temperatures.

The invention consists in the improved constructions, arrangements and devices to be hereinafter described and claimed for carrying out the above stated objects and such other incidental objects as will be referred to in connection with the following description of the preferred embodiment of the invention illustrated in the accompanying drawings.

In the drawings,

Fig. 1 is a view, in elevation, of the indicating device shown as mounted on the radiator of an automobile and viewed from the driver's seat.

Fig. 2 is a vertical sectional view of the device taken on line 2—2 of Fig. 4.

Fig. 3 is a view, in perspective, of a spring employed for moving certain parts of the signaling device.

Fig. 4 is a side elevation of the device with the upper part shown in section.

Fig. 5 is a detail view, in elevation, of the switch for closing the circuit through the electric lamp for illuminating the signals.

Figs. 6, 7 and 8 are sectional views of the upper portion of the indicator corresponding to the showing of Fig. 2, but with the scale enlarged; Fig. 6 showing the parts of the mechanism when the engine temperature is approaching the upper limit of the normal range; Fig. 7, the position of the parts when indicating a supernormal engine temperature, and Fig. 8 the parts of the mechanism in the position which they assume while the engine temperature is above normal but has diminished and is approaching the normal range.

The indicator, as shown in the drawings, is designed to be screwed upon or otherwise fastened to the filling spout of the automobile radiator and comprises a thermostatic element located over the filling spout so as to be affected by changes in temperature of the water or other medium used for cooling the engine, and above the thermostat a signaling mechanism consisting of a lamp which is lighted when the engine heats to normal, and a movable shutter carrying two differently colored screens or light filters, one of which screens stands in front of the lamp when the engine is operating at normal or subnormal temperature, the shutter being moved when the engine temperature exceeds the normal range to bring the other screen in front of the light. In the arrangement shown a green screen stands in front of the light at normal and subnormal temperatures, the screen being illuminated for normal temperatures but not for subnormal temperatures, the screen indicating supernormal temperatures being colored red. The casing which houses the operative parts of the mechanism is hinged to the part attached to the filling cap so that the indicator may be turned back for filling the radiator. The movement of the shutter is through operation of a spring put under tension by expansion of the thermostatic element. The shutter, however, is held by a latch in its normal position until the thermostat has expanded to a definite extent, corresponding, preferably, to the upper limit of the normal range of engine temperatures, whereupon, on further expansion of the thermostat, the latch is withdrawn, allowing the spring to move the shutter from the green to the red position. Similarly, on fall of temperature, the shutter is held in the red position until the engine temperature reaches the normal range.

Referring to the drawings, 10 designates a ring interiorly threaded so as to be screwed upon the filling spout 11 of an automobile. The ring is held in place on the filling spout by a set screw 12 (Fig. 2) covered by an annular member 13, provided preferably with the ornamental arms 14, which is held against a shoulder 16 on the ring 10 by means of a locking ring 17. 18 is a casing hinged at 19 to the ring 10 and formed at the bottom with a flange 20 recessed to receive a gasket 21 which bears against a rib 22 on the ring 10. The casing 18 and ring 10 are formed with lugs 23, 24 (Fig. 4) for a clamping screw 25 or other suitable fastening device whereby the casing may be drawn down tightly upon the ring. Set into the bottom of casing 18 is a spider 26 secured to the casing by screws 27. The casing 18 contains the thermostatic element which is shown as consisting of a series of diaphragms 28 to the lower one of which is connected a well-forming member 29 adapted to contain a fluid which vaporizes at a relatively low temperature. The well portion of the thermostat extends through the hub 30 of spider 26 and is threaded for a nut 31 which holds the thermostat in place upon the spider.

The indicating or signaling mechanism is contained in a casing 32 formed with a neck portion 33 which is fastened to the top of casing 18 by screws 34. The stem 35 of the thermostat extends through a bore in the neck portion 33 of casing 32. Secured to the stem by nuts 36, or other suitable means, is a flexible, preferably metallic, diaphragm 37 adapted to bear against the under side of the top of casing 18, a light coiled spring 38 being interposed between the thermostat and diaphragm 37. The casing 32 is formed in the front (the term indicating throughout the specification and claims the side of the device which is toward the driver of the automobile) with a circular opening in which is set a glass plate or lens 39 held in place by a locking ring 40. Behind the lens is an opaque plate 41 having a central opening 42. The other side of the casing 32 is formed with a circular opening interiorly threaded to receive the threaded portion 43 of an annular member 44 into which is set a glass plate 45. If desired, a transparent or translucent plate 46 bearing an emblem or advertising device may be arranged back of the glass plate 45. The threaded portion 43 of annular member 44 is formed with a spider 47 supporting a cup 48, which may be formed integrally with the spider and ring, having an insulating lining 49 into which is set a socket 50 for an electric lamp 51.

Arranged within the casing and attached to lugs 52 and 53 formed on the interior thereof, is an arcuate plate 54 to the upper part of which is fixed a stud 55 for pivotally suspending the shutter 56, the latter being formed with two circular openings, one covered by a green screen 57 and the other by a red screen 58. The upper end of the thermostat stem 35 carries an elbow shaped piece 59 to which is pivoted at 60 a bell crank 61 which is fulcrumed on a pivot stud 62 on plate 54. A spring 63 is coiled around the stud 55, one end 64 of the spring bearing against a lug 65 on the upper end of bell crank 61, the other end 66 of the spring bearing against a lug 67 formed on the oscillating shutter 56. The shutter is provided at its lower edge with two lugs 68, 69, the ends of which are bent so as to extend backwardly as indicated at 70, 71. Pivoted at 72 to the right hand end of plate 54 is a latch 73 connected to the short end 74 of bell crank 61 by a link 75 and formed with a forwardly projecting hook 76.

The electrical connections for the lamp 51 are as follows, the arrangement shown adapting the device for being connected with the single wire or grounded circuit system used on most automobiles: 77 is a supply wire entering the casing 32 through an opening 78 and connected with a contact plate 79, secured to but electrically insulated from plate 54. 80 is another contact plate on plate 54 electrically connected by a stud 81 with a spring 82, the end of which bears against the lamp socket 50, plate 80 and spring 82 being insulated from plate 54 by a bushing 83.

Carried on the upper end of the bell crank 61, with the interposition of insulation 84, is the switch member 85 adapted to bridge the gap between contact plates 80 and 79 when the bell crank has been rocked from its initial position through the partial expansion of the thermostat 28.

*Operation.*—Fig. 2 shows the parts of the indicating mechanism in the positions which they assume when the engine is cold. The upper edge of latch 73 is slightly below the lower edge of lug 68 of the shutter. The shutter is held in its right hand position by the engagement of lug 67 on the shutter with the extremity 64 of spring 63 and the engagement of lug 65 on the bell crank 61 with the other end 66 of spring 63, the spring being sufficiently stiff to hold up the shutter in the oblique position indicated in Fig. 2. As the engine heats up, heating the fluid medium of its cooling system, the temperature in the radiator above the water level will rise, causing the expansion of thermostat 28. This movement is imparted to bell crank 61 through thermostat stem 35 and the bell crank is rocked toward the left. At the same time the latch 73 is raised so that its hook 76 engages the lug 68 on the lower edge of the shutter 56. When the engine has heated up enough so that its temperature may be considered as coming within the normal range of working temperatures of the engine, thermostat 28 will have been expanded so as to rock bell crank 61 a sufficient distance to bring switch arm 85 into contact with contact plate 79, bridging the gap between this plate and plate 80. Current will now be supplied to the lamp through wire 77, contact plate 79, switch arm 85, contact plate 80, stud 81, spring 82, lamp socket 50 and through the lamp 51 to ground.

As the thermostat continues to expand, due to continued rise of engine temperature, the bell crank 61 will be rocked further and further to the left, without, however, breaking the contact between the switch arm and plates 79, 80, and without effecting any change of movement in the shutter 56 until the engine reaches a temperature beyond the upper limit of the normal range, the shutter being held against movement to the left by latch 73 so that the rocking of the bell crank involves merely a tensioning of spring 63, the ends 64 and 66 of which are spread apart, as indicated in Fig. 6. This figure shows the indicating mechanism with the parts in the position which they assume when the engine temperature is approaching the upper limit of the normal range. As soon as the engine temperature exceeds the normal range the thermostat expansion rocks the bell crank far enough to lift the hook 76 of latch 73 out of engagement with the lug 68 of the shutter 56, whereupon the tension of the spring thrusts the shutter from right to left, bringing the red screen 58 in front of the lamp. The leftward movement of the shutter is stopped by contact with the side of the casing. Fig. 7 shows the position of the parts of the mechanism as just described. The circuit through the lamp remains uninterrupted.

As soon as the engine begins to cool down, the contraction of the thermostat rocks bell crank 61 from left to right (having reference to its long arm), so that the lug 65 on the bell crank is moved backwardly away from the end 64 of spring 63. This movement of the bell crank draws latch 73 downwardly into the path of lug 69 on the lower edge of the shutter so that the shutter will move to the right a short distance only, not far enough to displace the red screen from its position between the lamp 51 and side opening 42. The parts of the mechanism are shown in this last described position in Fig. 8. They remain in this position until the engine temperature has diminished so as to be within the normal range. By this time the latch has been pulled down so that it clears the lug 69. The rocking movement of the bell crank exerted against the shutter through spring 63 now returns the shutter to approximately its normal position, interposing the green screen 57 between the lamp and sight opening 42. So long as the engine continues to operate at a temperature within the normal range the lamp will remain lighted. If the engine temperature falls below the normal range the resultant contraction of the thermostat will rock the bell crank far enough to the right to move switch arm 85 away from contact plate 79. The green signal will be displayed but as the signal is no longer illuminated the driver can tell at once that the motor is running colder than it should run.

In order to fill the radiator, screw 25 is disconnected from lug 24 (Fig. 5) and the indicator turned over upon the automobile hood, giving access to the filling spout. The arrangement of the set screw 12 and annular member 13 effectively prevents theft of the indicator by concealment of the means which fastens the instrument to the filling spout.

I claim:

1. In a temperature indicator for engines, an electric lamp, a shutter movable to display two different indicating portions, and mechanism actuated through change in temperature of the engine to move the shutter and control the lamp, for giving one indication when the engine is at temperatures within the normal range, and two indications of respectively different characters when the engine is at either high or low abnormal temperatures.

2. In a temperature indicator for engines, an electric lamp, and means responsive to changes in temperature of the engine for closing the circuit through the lamp when the engine heats to a certain temperature, and for changing the color of the light beam emitted from the lamp when the engine heats to a certain higher temperature.

3. In a temperature indicator for engines, an electric lamp, and means comprising a movable shutter responsive to changes in temperature of the engine, for controlling the circuit through the lamp and varying the character of the indications given by the lamp in accordance with temperature changes in either direction from normal.

4. In a temperature indicator for engines, an electric lamp, and means comprising a movable shutter provided with different colored screens, and responsive to changes in temperature of the engine, for controlling the lamp and positioning screens of different color between the lamp and the observer to vary the character of the indications in accordance with the temperature of the engine.

5. In a temperature indicator for engines, a light emitting body, a shutter movable to display two different indicating portions, and means actuated through changes in temperature of the engine to shift the shutter in front of the light emitting body and to control the light emitting body to vary the indications given.

6. In a temperature indicator for engines, a light and two movable screens designed to give different indications, and means actuated through changes in temperature of the engine for moving the screens with relation to the light, and energizing or deenergizing the light, in such order that more than two different visible signals are given to indicate differing temperature conditions of the engine.

7. In a temperature indicator for engines, the combination of a casing having a sight opening in the front, an electric lamp in said casing, a movable shutter interposed between said lamp and sight opening, a thermostat subject to changes of temperature of the engine, and movable means actuated by the thermostat for making and breaking said lamp circuit and controlling the movements of the shutter.

8. In a temperature indicator for engines, the combination of a casing having a sight opening in the front, an electric lamp in said casing, a movable shutter provided with color screens interposed between said lamp and sight opening, a thermostat subject to changes of temperature of the engine, and movable means actuated by the thermostat for making and breaking said lamp circuit and controlling the movements of the shutter.

9. In a temperature indicator for engines, the combination of a casing having a sight opening in the front, an electric lamp in said casing, a shutter provided with a color screen which is in line with said sight opening and lamp when the engine is cold, and with a second color screen of different color, and thermostatic means subject to temperature changes of the engine which closes the lamp circuit when the engine heats to a normal operating temperature and brings about a movement of said shutter to bring the second screen in line with the lamp and sight opening when the engine heats to a temperature above the range of normal operating temperatures of the engine.

10. In a temperature indicator for engines, the combination of a casing having a sight opening in the front, an electric lamp in said casing, a shutter formed with a color screen which is in line with said sight opening and lamp when the engine is cold, and with a second color screen of different color, a thermostatically operated means which operates as the engine temperature increases to close said lamp circuit, a spring bearing on said shutter in position to move the same and stressed by action of said thermostatically operated means, and a latch to hold said shutter which is released by action of the thermostat when the engine heats to a higher temperature.

11. In a temperature indicator for engines, the combination of a movable indicating element, a thermostat subject to changes in temperature of the engine, and means actuated by movement of the thermostat for causing predetermined movements of said indicating element at definite engine temperatures, and a light emitting body which is controlled by and cooperates with said movable indicating element in giving indications of the temperature at which the engine operates.

12. In a temperature indicator for automobile engines of the fluid cooled type, the combination of a thermostat casing adapted to be attached to the radiator of the automobile, a casing thereon having a sight opening, an electric lamp in said casing, a thermostat stem projecting into said casing, making and breaking mechanism for the lamp circuit operated by said stem, an oscillating shutter formed with light screens of different colors arranged between said lamp and said opening, a latch to engage said shutter, a spring for moving said shutter when released by the latch and means operated by said thermostat stem for stressing said spring and moving the latch to release said shutter.

13. In a temperature indicator for automobile engines of the fluid cooled type, the combination of a thermostat casing adapted to be attached to the radiator of the automobile, a casing thereon having a sight opening, an electric lamp in said last named casing, a thermostat stem projecting into said last named casing from the thermostat casing, a bell crank pivotally connected therewith, an oscillating shutter formed with light screens of different colors arranged between said lamp and sight opening, a coiled spring, one end of which bears against said shutter and the other against one end of said bell crank, a latch to engage said shutter, a link operatively connecting said latch to the other end of said bell crank, a switch member on said bell crank for making and breaking the lamp circuit and a thermostat in said thermostat casing with which said stem is connected for rocking said bell crank to stress said spring and bring about an engagement of the latch with and its disengagement from the shutter.

14. In a temperature indicator for automobile engines of the fluid cooled type, the combination of a thermostat casing adapted to be attached to the radiator of the automobile, a casing thereon having a sight opening, an electric lamp in said last named casing, a thermostat stem projecting into said last named casing from the thermostat casing, a bell crank pivotally connected therewith, an oscillating shutter formed with light screens of different colors arranged between said lamp and said opening, the lower edge of which is provided with a pair of projecting lugs, a pivoted latch adapted to engage said lugs in different positions of the shutter to align one or the other of said light screens with the lamp and sight opening, a coiled spring, one end of which bears against said bell crank and the other against said shutter, a link operatively connecting the latch with said bell crank, a switch member on said bell crank for making and breaking the lamp circuit and a thermostat in said thermostat casing with which said stem is connected for rocking said bell crank to stress said spring and bring about an engagement of the latch with and its disengagement from the shutter

CLAYTON A. DUNHAM